(12) United States Patent  (10) Patent No.: US 6,749,068 B1
Dias                      (45) Date of Patent: Jun. 15, 2004

(54) SLOPED SCREEN SEPARATOR THAT REMOVES SOLIDS FROM A MANURE SLURRY

(76) Inventor: Richard A. Dias, 6970 Corona Ave., Kingsburg, CA (US) 93631

( * ) Notice: Subject to any disclaimer, the term of this patent is extended or adjusted under 35 U.S.C. 154(b) by 80 days.

(21) Appl. No.: 10/108,608

(22) Filed: Mar. 27, 2002

Related U.S. Application Data

(63) Continuation-in-part of application No. 09/822,898, filed on Mar. 30, 2001.

(51) Int. Cl.[7] ................................................ B03B 1/00
(52) U.S. Cl. ........................................ 209/132; 210/768
(58) Field of Search ............................... 209/132, 254, 209/275, 250; 210/768, 767, 805, 803, 739, 741

(56) References Cited

U.S. PATENT DOCUMENTS

| 4,233,159 A | | 11/1980 | Senda et al. ................. 210/413 |
| 4,592,275 A | * | 6/1986 | Frankl .......................... 99/495 |
| 4,990,249 A | | 2/1991 | Leuenberger ............... 210/167 |

OTHER PUBLICATIONS

Dr. Brion Duffy, "Manure Solids Removal Using Dual–Separator System Developed by Richard Dias", United States Department of Agriculture, Agricultural Research Service, Food Safety and Health Research Unit, Albany, CA 94710, sheets 1–10. (Inventor received approx. Aug.–Sep. 2001).

Hoard's West Dairyman staff, "Once is not Enough", Hoard's West, cover sheet and pages W–74–W–75, Apr. 25, 2001.

D.L. Meyer et al., Proceedings of the 36th Annual Dairy Cattle Day, University of California, Department of Animal Science, Evaluation of Mechanical Solid Liquid Separators "Which Solid Liquid Separator is Best?", U.C. Davis, Dairy Day, Mar. 26, 1997, cover sheet and pp. 48–49.

* cited by examiner

Primary Examiner—Kenneth W. Noland
(74) Attorney, Agent, or Firm—Pillsbury Winthrop LLP

(57) ABSTRACT

A large percentage of solids are removed from a manure slurry when the slurry is run across a sloped screen separator. The sloped screen on the separator has very small openings. Further, the separator controls the air flow through the sloped screen. In addition, the separator can have a water line with spray heads formed across the sloped screen. The spray heads direct water under pressure on the manure slurry on the sloped screen.

20 Claims, 11 Drawing Sheets

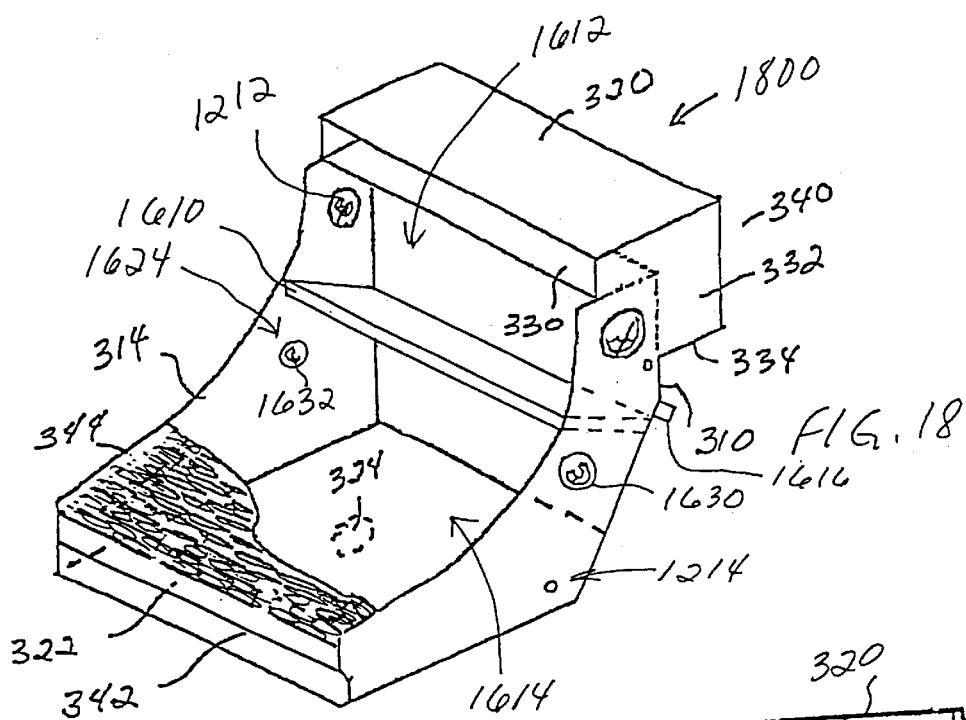
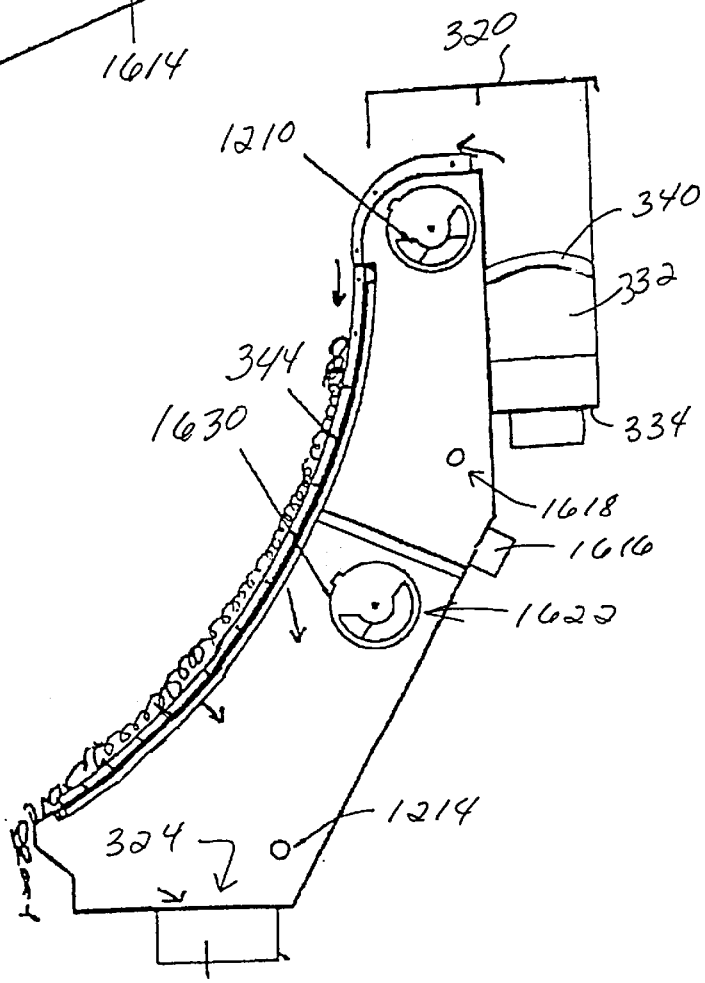

SLOPED SCREEN SEPARATOR THAT REMOVES SOLIDS FROM A MANURE SLURRY

RELATED INVENTION

The present invention is a continuation-in-part of application Ser. No. 09/822,898 filed on Mar. 30, 2001 for Sloped Screen Separator that Removes Solids from a Manure Slurry by Richard A. Dias.

BACKGROUND OF THE INVENTION

1. Field of the Invention

The present invention relates to a separator and, more particularly, to a sloped screen separator that removes solids from a manure slurry.

2. Description of the Related Art

When waste, such as manure, is washed away with a stream of flush water, a waste or manure slurry is formed. In agriculture, enclosed animal areas are commonly flushed with water. For example, in the dairy industry, the alleys in a freestall barn are typically flushed twice a day with water to clean the manure from the alleys.

The treatment of manure slurry is a difficult and on-going problem in many agricultural settings. One approach to treating manure slurry is to fill large settling pits or lagoons with the slurry. Gravity then pulls the larger solids to the bottom. The surface water, which contains fewer solids, is typically pumped to another lagoon, where the process is repeated. The surface water of the last lagoon is then pumped out to irrigate agricultural lands, such as alfalfa fields, or used again to flush accumulated manure from animal areas.

This approach, while relatively straightforward, has a number of drawbacks. One drawback is that the accumulated solids in the lagoons have to be periodically removed at a significant expense. Another drawback is that the longer the manure stays in suspension within the slurry, the more nutrients transfer from the solids to the water.

This loads the water with very high levels of nitrogen, phosphorous, and salts. A high loading, in turn, limits the amount of irrigation that can be performed, or requires the addition of fresh water to change the loading of the water. A further problem is that a significant amount of gas, such as ammonia and sulfer, escapes from the slurry in a lagoon, thereby contributing to air pollution.

A common modification to this approach is to run the manure slurry through a separator to remove as many solids from the slurry as possible. By removing solids from the slurry, fewer solids are deposited in the lagoons. Reducing the amount of solids that are deposited into a lagoon increases the useful life of the lagoon, reduces the loading of the water (because solids are removed from the water), and reduces air pollution. One type of separator is a sloped screen separator.

FIG. 1 shows a cut-away perspective view that illustrates a conventional sloped-screen separator 100, while FIG. 2 shows a side view of separator 100. As shown in FIGS. 1–2, separator 100 has a back wall 110, and first and second side walls 112 and 114 that are connected to back wall 110. Side walls 112 and 114, in turn, have openings 116 and 118.

In addition, separator 100 has a top panel 120 that is connected to the top ends of side walls 112 and 114, and a lower panel 122 that is connected to the bottom ends of back wall 110 and side walls 112 and 114. Lower panel 122, in turn, has an opening 124.

Separator 100 also has a ledge 130 that is connected to side walls 112 and 114, and a trough 132 that is connected to back wall 110, side walls 112, and ledge 130. Trough 132 has a bottom side 134, and an opening 136 formed in bottom side 134. Separator 100 further includes a baffle 140 that is connected to side walls 112 and 114 over the longitudinal center of trough 132.

As further shown in FIGS. 1–2, separator 100 has a front edge 142 that is connected to side walls 112 and 114 and lower panel 122, and a sloped screen 144 that is connected to side walls 112 and 114, ledge 130, and front edge 142. Sloped screen 144 typically has slotted or circular openings of 1.5 mm (approximately 0.060 of an inch).

In operation, manure slurry is pumped into trough 132 through opening 136. Baffle 140 spreads the incoming slurry so that the slurry flows evenly over the edge of ledge 130 onto sloped screen 144. The slurry flows through screen 144, with screen 144 extracting the larger solids from the slurry.

Gravity pulls the larger solids extracted by screen 144 down the face of screen 144. The solids accumulate at the bottom of screen 144, and eventually fall off of front edge 142 where the solids are collected as stackable manure. In the dairy industry, stackable manure has a moisture content of roughly 75–80%.

One problem with separator 100 is that separator 100 is relatively inefficient. Experimental results indicate that separator 100 removes, at best, approximately 16% of the solids in the slurry. Thus, even though separator 100 removes solids from the slurry, large amounts of solids continue to be added to the lagoons.

Screens with smaller openings are difficult to utilize because the solids in the slurry plug the openings. When the openings in the screen become plugged, all the slurry pumped into opening 136 of trough 132 runs down the face of screen 144 and falls off of front edge 142, causing slurry to be pumped into the work yard. The resulting clean up can be a significant expense. Thus, due to plugging, screens with smaller openings are difficult to utilize.

With separator 100, the slurry falls through screen 144 and is collected by lower panel 122. The slurry then flows out opening 124 where the slurry is gravity fed to a lagoon. The flow of slurry into opening 124 creates a suction. If openings 116 and 118 were absent or closed, the suction would pull air through screen 144. The flow of air through screen 144, however, pulls and holds solids to screen 144, thereby plugging the openings. Thus, openings 116 and 118 provide an air intake route that eliminates the suction across screen 144 so that larger solids can fall down the face of screen 144.

Screen 144 is also subject to plugging from hot summertime conditions. When the available slurry has been pumped through separator 100, solids to varying degrees remain on the face of screen 144. In hot summertime conditions, the solids quickly dry. When the slurry is again pumped into separator 100, the initial slurry runs down the face of screen 144 and falls off front edge 142 until the moisture in the slurry unplugs the openings.

One approach to preventing summertime conditions from plugging screen 144 is to mist the face of screen 144 when slurry is no longer being pumped into separator 100. This can be accomplished by placing a water line with a number of mist heads across the front of screen 144.

When the water line is connected to a water source under pressure, such as 2.46 kilograms per square centimeter (approximately 35 pounds per square inch) to 3.87 kilograms per square centimeter (approximately 55 pounds per square inch), the mist heads output mist in the range of 2.65 liters per hour (approximately 0.7 gallons per hour) to 4.9 liters per hour (approximately 1.3 gallons per hour). The level of misting should not cause solids to move down or sheet down the face of screen 144.

Thus, although sloped screen separators reduce the volume of solids that are deposited into the holding lagoons, there is a need for a separator that removes more solids from the manure slurry.

SUMMARY OF THE INVENTION

The present invention provides a sloped screen separator. The sloped screen separator of the present invention includes a sloped screen that receives a manure slurry. The sloped screen has a plurality of screen openings and a width. In addition, the sloped screen separator has a collection compartment that is connected to the sloped screen. The collection compartment has an air flow opening and a slurry exit opening, and receives a screened slurry that falls through the sloped screen when the manure slurry flows onto the sloped screen. The screened slurry flows out through the slurry exit opening. The separator also has an air flow controller that is connected to the collection compartment. The air flow controller controls a first volume of air that flows through the sloped screen as a result of the screened slurry flowing through the slurry exit opening.

The separator can additionally include a water pipe that is connected to the collection compartment, and extends across the sloped screen. Further, a plurality of spray heads are connected to the water pipe. The spray heads output a liquid at a rate that ranges from equal to or greater than 113 liters per hour to equal to or less than 1362 liters per hour per approximately 0.31 meters of the width of the screen.

The present invention also includes a method of removing solids from a manure slurry. The method includes the step of running the manure slurry over a sloped screen. The sloped screen having a width and a plurality of screen openings. The method further includes the steps of controlling a volume of air that flows through the sloped screen. The method further includes the step of collecting a screened slurry that falls through the sloped screen in a collection compartment.

The method can additionally include the step of running the screened slurry over a second sloped screen. The second sloped screen has a width and a plurality of screen openings. The method can further include the steps of controlling a volume of air that flows through the second sloped screen, and collecting a twice screened slurry that falls through the second sloped screen in a second collection compartment.

The method can additionally includes the step of spraying the manure slurry on the screen with a liquid with sprayers at a rate that ranges from equal to or greater than 113 liters per hour to equal to or less than 1362 liters per hour per approximately 0.31 meters of the width of the screen. The method also includes the step of controlling a volume of air that flows through the sloped screen.

A better understanding of the features and advantages of the present invention will be obtained by reference to the following detailed description and accompanying drawings that set forth an illustrative embodiment in which the principles of the invention are utilized.

BRIEF DESCRIPTION OF THE DRAWINGS

FIG. 18 is a cut-away perspective view illustrating a sloped-screen separator 1800 in accordance with the present invention.

FIG. 19 is a side view of separator 1800 in accordance with the present invention.

DETAILED DESCRIPTION

Figure 1:
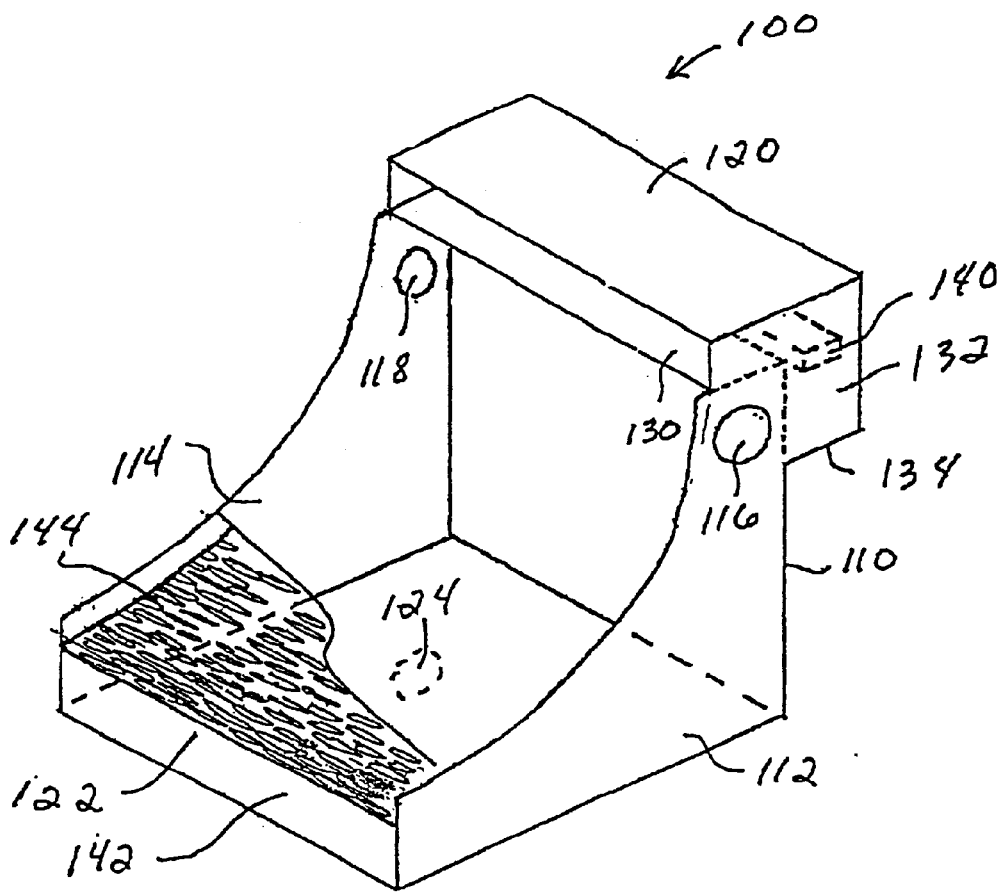
FIG. 1 is a cut-away perspective view illustrating a conventional sloped-screen separator 100.
Figure 2:
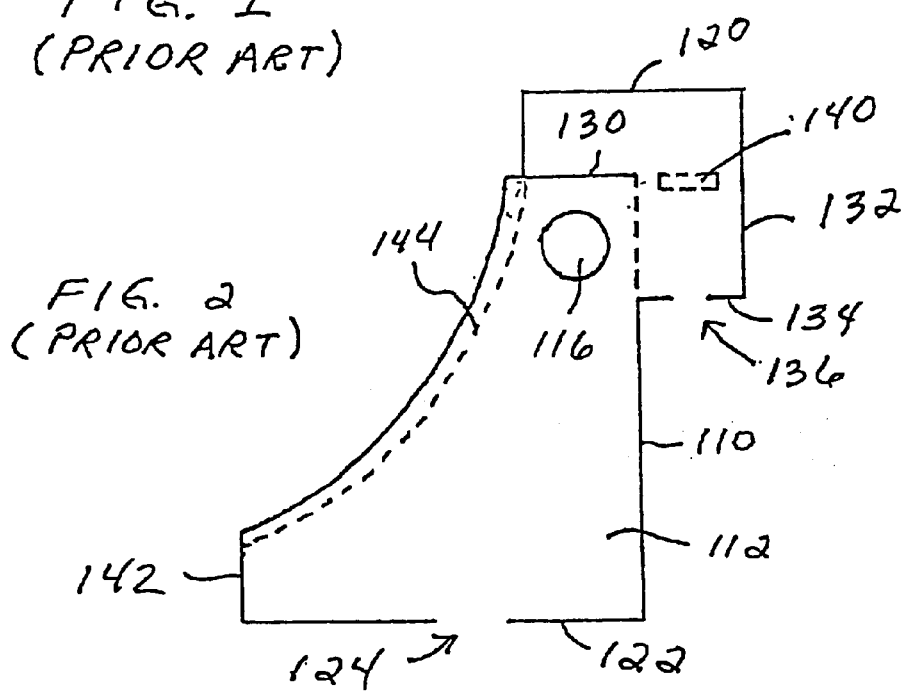
FIG. 2 is a side view of separator 100.
Figure 3:
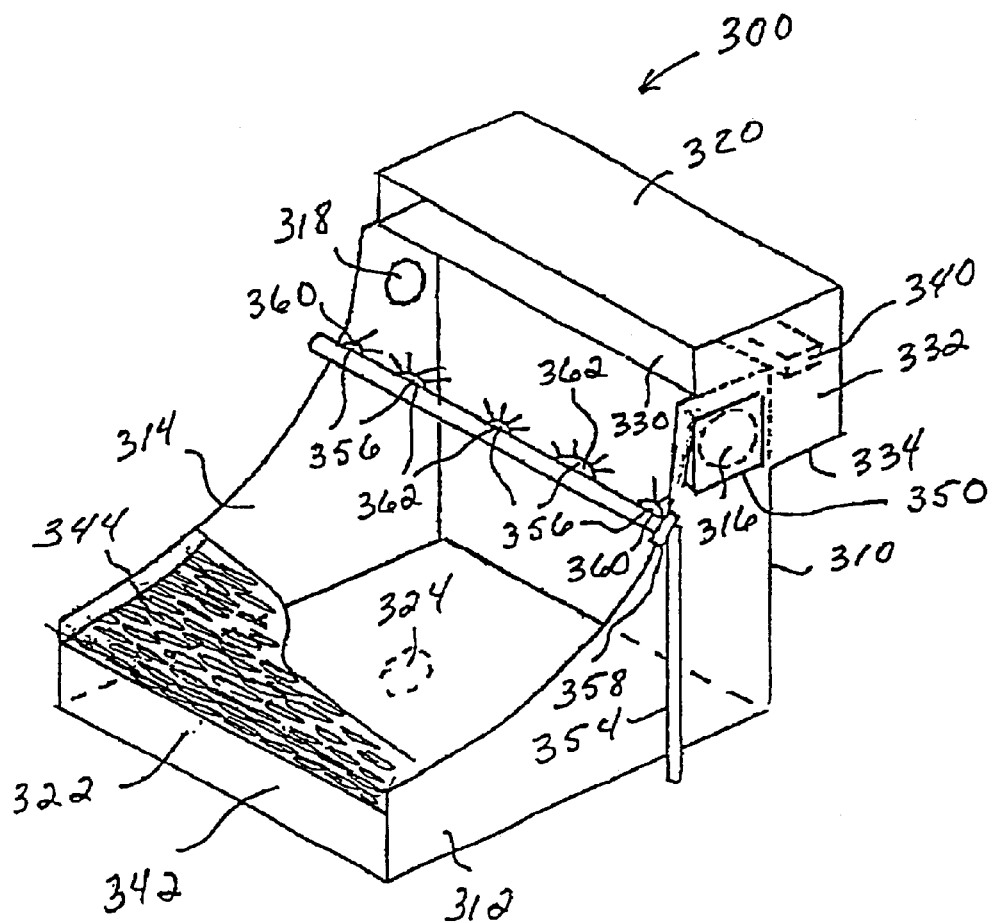
FIG. 3 is a cut-away perspective view illustrating a sloped-screen separator 300 in accordance with the present invention.
Figure 4:
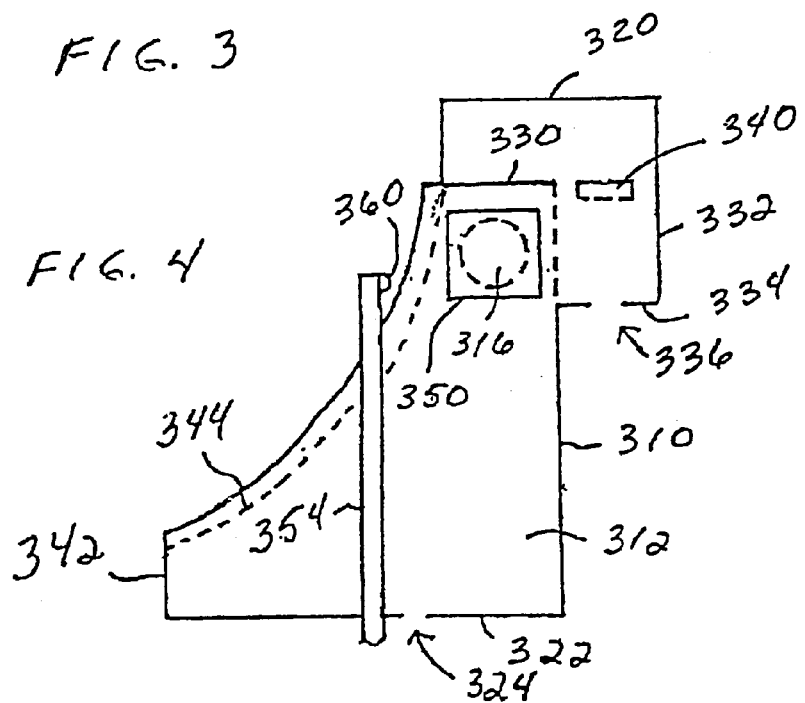
FIG. 4 is a side view of separator 300 in accordance with the present invention.
Figure 5:
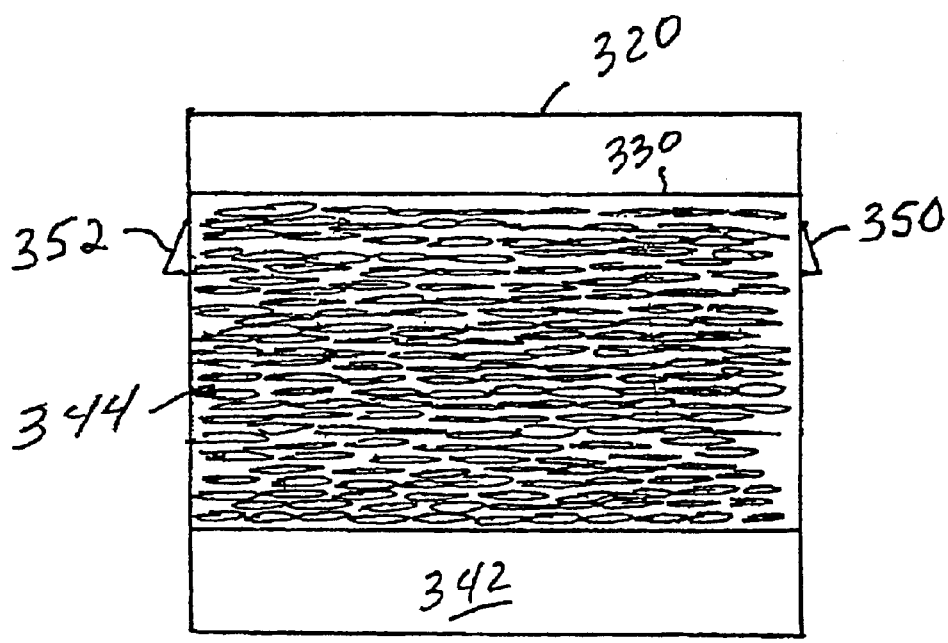
FIG. 5 is a front view of separator 300 in accordance with the present invention.

FIG. 3 shows a cut-away perspective view that illustrates a sloped-screen separator 300 in accordance with the present invention. FIG. 4 shows a side view of separator 300, while FIG. 5 shows a front view of separator 300. As shown in FIGS. 3–5, separator 300 has a back wall 310, and first and second side walls 312 and 314 that are connected to back wall 310. Side walls 312 and 314, in turn, have openings 316 and 318, respectively.

In addition, separator 300 has a top panel 320 that is connected to the top ends of side walls 312 and 314, and a lower panel 322 that is connected to the bottom ends of back wall 310 and side walls 312 and 314. Top panel 320 can be optionally omitted. Lower panel 322 has an opening 324.

Separator 300 also has a ledge 330 that is connected to side walls 312 and 314, and a trough 332 that is connected to back wall 310, side walls 312 and 314, and ledge 330. Trough 332 has a bottom side 334, and an opening 336 formed in bottom side 334. Separator 300 further includes a baffle 340 that is connected to side walls 312 and 314 over the longitudinal center of trough 332.

As further shown in FIGS. 3–5, separator 300 has a front edge 342 that is connected to side walls 312 and 314 and lower panel 322, and a sloped screen 344 that is connected to side walls 312 and 314, ledge 330, and front edge 342. Trough 332 defines an inflow compartment that has input opening 336 and output ledge 330, while the region between back wall 310, side walls 312 and 314, lower panel 322, front edge 342, and sloped screen 344 define an outflow compartment. The outflow compartment has an air flow opening 316/318 and a slurry exit opening 324.

In the example shown in FIGS. 3–5, sloped screen 344 has openings that range from greater than the size where slurry will not flow through the openings without being shaken, which is approximately 0.15 mm (approximately 0.006 of an inch), to less than 1 mm (approximately 0.040 of an inch). Thus, the present invention utilizes opening sizes that were previously considered to be unworkable.

Further, separator 300 includes an air flow controller 350 connected to opening 316, and an air flow controller 352 connected to opening 318. Controllers 350 and 352 variably control the volume of air that can flow into openings 316 and 318, respectively, to thereby vary the volume of air that is pulled through screen 344. For example, if controllers 350 and 352 restrict the volume of air that can flow into openings 316 and 318 to zero, effectively closing openings 316 and 318, all of the air would be pulled through screen 344.

In the example shown in FIGS. 3–5, separator 300 also includes a water line 354 that is attached to side walls 312 and 314 and positioned across the face of screen 344 about ¼ of the way down from the top of screen 344. Separator 300 further includes a number of spaced-apart spray heads 356 that are connected to water line 354. Spray heads 356 are positioned about 0.31 meters (approximately one foot) from the face of screen 344 (measured along a horizontal plane that passes through spray heads 356).

The section of water line 354 between side walls 312 and 314 can be rotatably coupled to the remainder of water line 354 via coupler 358. As a result, the angle at which the water output by heads 356 strikes screen 344 can be changed by rotating the section of water line 354 between side walls 312 and 314. Best results appear to be obtained when water strikes screen 344 at a point above spray heads 356, such as roughly an angle of 65° (measured counter clockwise from a horizontal plane passing through spray heads 356).

Spray heads 356 include two quarter-circle spray heads 360 that are positioned next to side walls 312 and 314, and a number of half-circle spray heads 362 that are positioned between heads 360. Heads 360 can be implemented, for example, with spray head model number S9Q sold by Champion Irrigation Products, while heads 362 can be implemented with, for example, spray heads model number S9H sold by Champion Irrigation Products.

Different arrangements of spray heads can also be used in the present invention. For example, rather than using two types of spray heads, all of the spray heads can be the same. In addition, narrow width screens (where width is measured from side wall 312 to side wall 314) can be implemented with only a single spray head.

Figure 6:
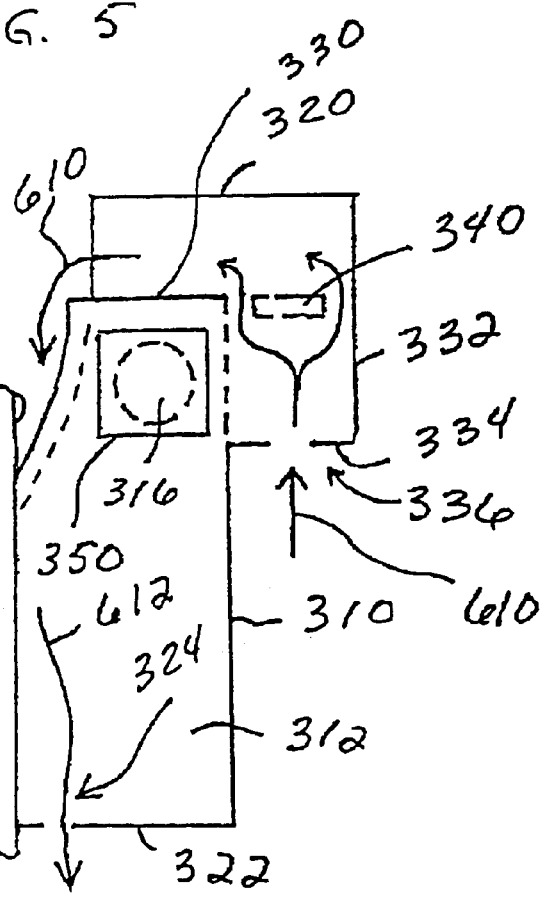
FIG. 6 is a side view of separator 300 illustrating the operation of separator 300 in accordance with the present invention.

FIG. 6 shows a side view of separator 300 that illustrates the operation of separator 300 in accordance with the present invention. As shown in FIG. 6, manure slurry 610 is pumped into trough 332 through opening 336 at a rate of approximately 1703.25 liters per minute (approximately 450 gallons a minute).

Baffle 440 spreads slurry 610 so that slurry 610 flows evenly over the edge of ledge 330 onto sloped screen 344 where slurry 610 is then sprayed by heads 360 and 362. Water line 354 is connected to a water source under pressure, such as in the range of 0.70 kilograms per square centimeter (approximately 10 pounds per square inch) to 5.27 kilograms per square centimeter (approximately 75 pounds per square inch).

With a pressure of approximately 3.17 kilograms per square centimeter (approximately 45 pounds per square inch), heads 360 output a spray of about 4.9 liters per minute (approximately 1.3 gallons per minute), while heads 362 output a spray of about 8.3 liters per minute (approximately 2.2 gallons per minute).

The amount of water sprayed on screen 344 can be adjusted by changing the water pressure, given a spray opening with a fixed size. Less water can be sprayed on a slurry that has a lower number of solids, while more water can be sprayed on a slurry that has a higher number of solids. For each 0.31 meters (approximately one foot) of screen width (where width is measured from side wall 312 to side wall 314), water is sprayed (approximately evenly) in the range of 1.89 to 22.71 liters per minute (approximately 0.5 to 6 gallons per minute).

In addition, controllers 350 and 352 reduce the volume of air that flows through openings 316 and 318 so that a volume of air is pulled through screen 344. A screened slurry 612 falls through screen 344, while solids 614 are extracted by screen 344. Gravity pulls solids 614 down the face of screen 344. Solids 614 accumulate at the bottom of screen 344, and eventually fall off of front edge 342 where the solids are collected as stackable manure.

In accordance with the present invention, controllers 350 and 352 are set to pull a greater volume of air through screen 344 when the slurry has a lower concentration of solids, and a smaller volume of air through screen 344 when the slurry has a higher concentration of solids.

Figure 7:
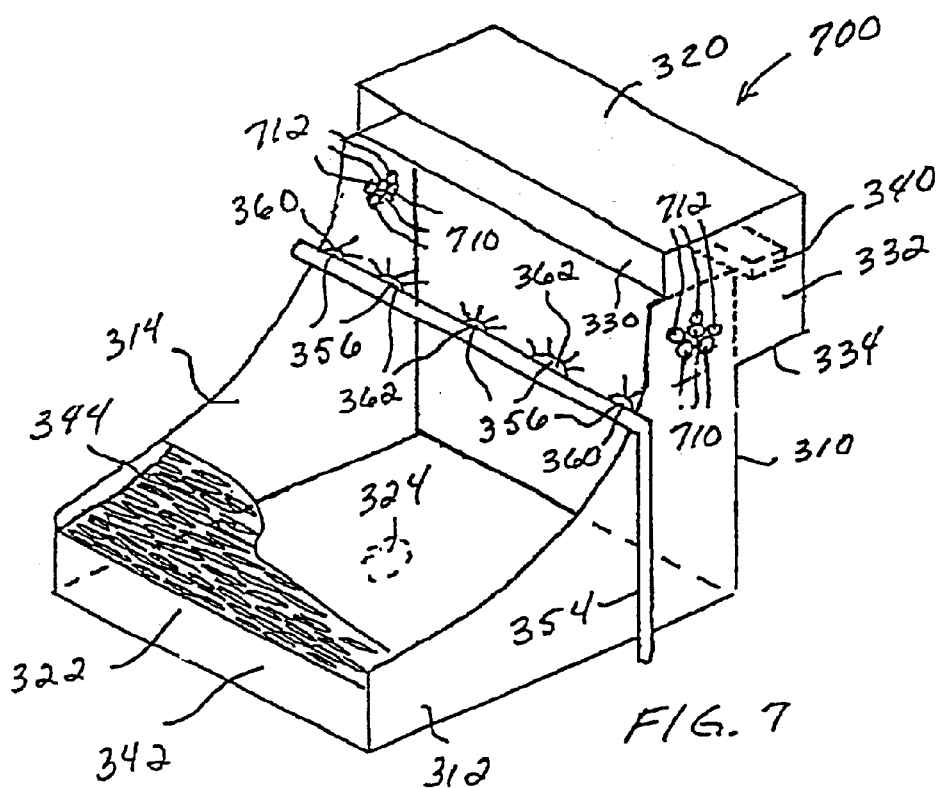
FIG. 7 is a cut-away perspective view illustrating a separator 700 in accordance with a first alternate embodiment of the present invention.

FIG. 7 shows a cut-away perspective view of a separator 700 in accordance with a first alternate embodiment of the present invention. Separator 700 is similar to separator 300 and, as a result, utilizes the same reference numerals to designate the structures which are common to both separators.

As shown in FIG. 7, separator 700 differs from separator 300 in that separator 700 has a plurality of openings 710 on each side wall 312 and 314 rather than single openings 316 and 318. Each opening 710, in turn, has a rotatably-connected cover 712. In operation, the volume of air pulled through screen 344 is determined by the number of openings 710 that are open, partially opened, or closed. For example, if all of the openings 710 were closed by covers 712, all of the air would be pulled through screen 344.

Figure 8:
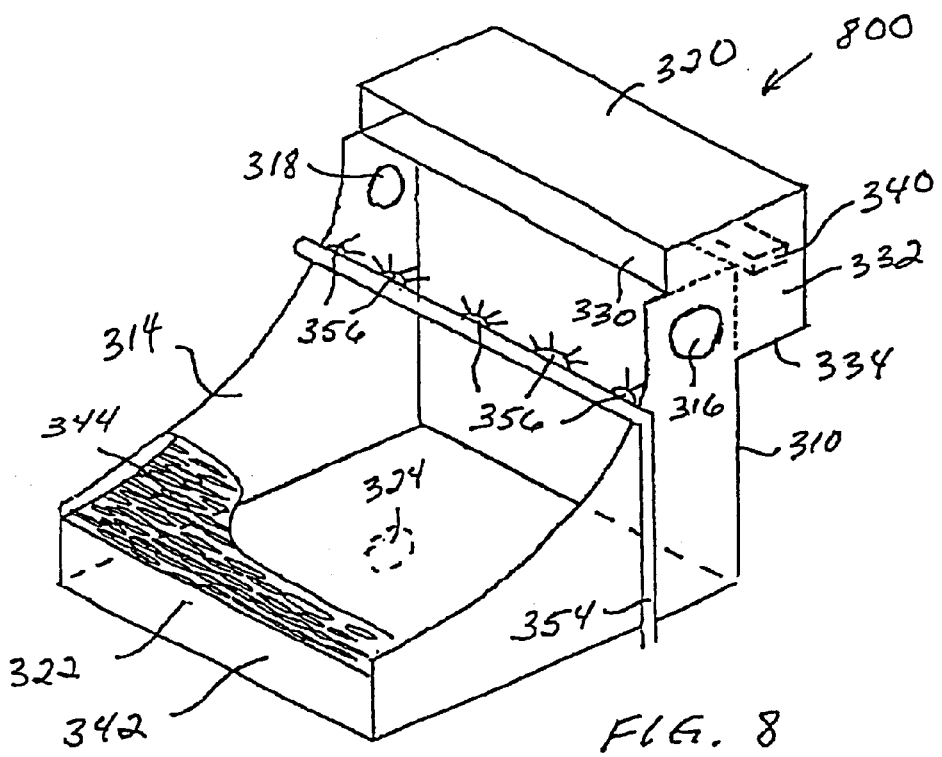
FIG. 8 is a cut-away perspective view illustrating a separator 800 in accordance with a second alternate embodiment of the present invention.

FIG. 8 shows a cut-away perspective view of a separator 800 in accordance with a second alternate embodiment of the present invention. Separator 800 is similar to separator 300 and, as a result, utilizes the same reference numerals to designate the structures which are common to both separators.

As shown in FIG. 8, separator 800 differs from separator 300 in that separator 800 does not have air flow controllers 350 and 352. In separator 800, openings 316 and 318 are formed to be large enough to prevent solids from being pulled into screen 344 as a result of slurry flowing out of opening 324. Separator 800 further differs from separator 300 in that separator 800 has openings ranging from about 0.51 mm (approximately 0.020 of an inch), to about 1.78 mm (approximately 0.070 of an inch). Experimental results taken with a screen having 0.89 mm (approximately 0.035 of an inch) openings indicate that, although not as dramatic as separator 300, separator 800 also removes more solids than does conventional separator 100.

Figure 9:
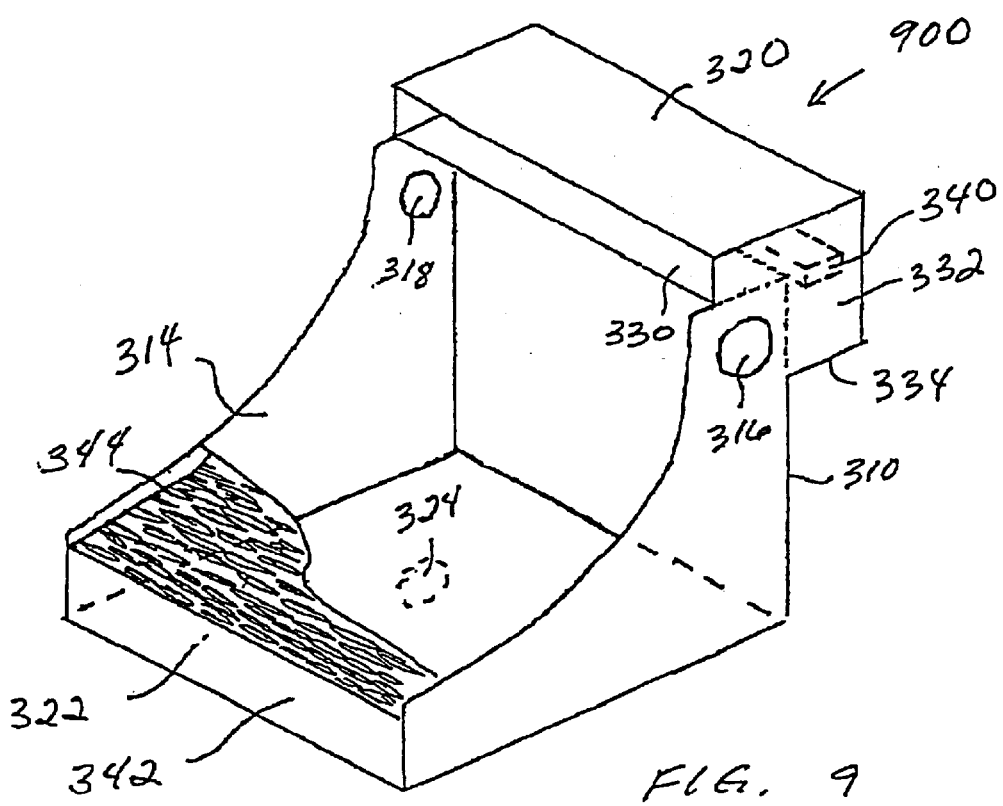
FIG. 9 is a cut-away perspective view illustrating a separator 900 in accordance with the present invention.

FIG. 9 shows a cut-away perspective view of a separator 900 in accordance with the present invention. Separator 900 is similar to separator 300 and, as a result, utilizes the same reference numerals to designate the structures which are common to both separators.

As shown in FIG. 9, separator 900 differs from separator 300 in that separator 900 does not have air flow controllers 350 and 352, water line 354, or spray heads 356. Separator 900 further differs from separator 300 in that separator 900 has openings ranging from about 0.51 mm (approximately 0.020 of an inch), to less than 1 mm (approximately 0.040 of an inch). Experimental results taken from separator 900 using about 0.89 mm (approximately 0.035 of an inch) openings indicate that as the percentage of solids in the slurry drops, the size of the openings can be reduced.

Figure 10:
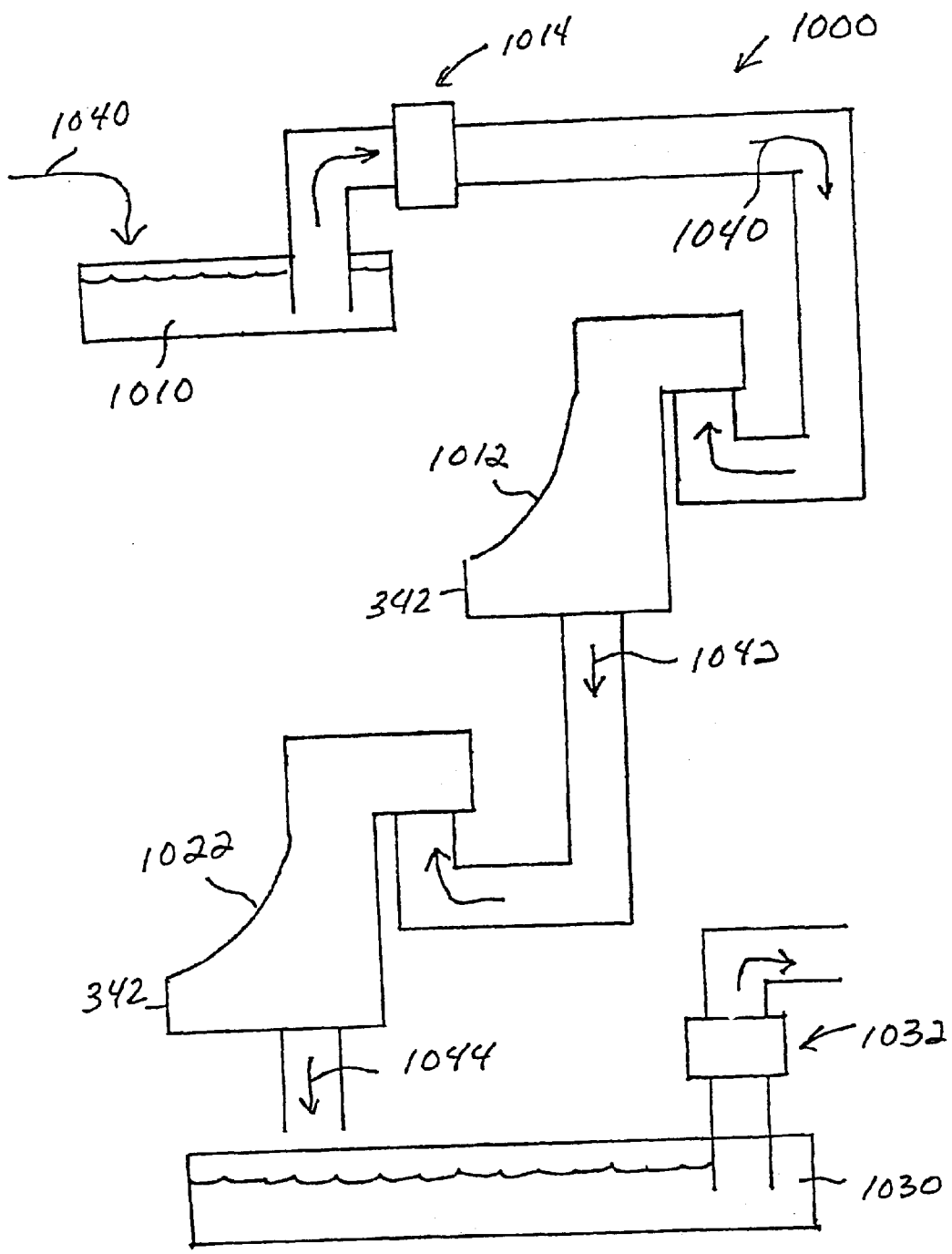
FIG. 10 is a drawing illustrating a manure management system 1000 in accordance with the present invention.

FIG. 10 shows a drawing that illustrates a manure management system 1000 in accordance with the present invention. As shown in FIG. 10, system 1000 includes an initial holding basin 1010, a first sloped-screen separator 1012, and a pumping system 1014 that pumps slurry from basin 1010 to separator 1012. Separator 1012, which has screen openings of a first size, can be implemented with separators 300, 700, 800, or 900. Separator 100 can alternately be used to implement separator 1012.

System 1000 further includes a second sloped-screen separator 1022 that receives slurry from separator 1012, a lagoon 1030 that receives slurry from separator 1022, and a pumping system 1032 that is connected to lagoon 1030. Separator 1022, which has screen openings of a second size, can be implemented with separators 300 and 700.

In accordance with the present invention, separator 1012 has screen openings that are larger than the screen openings of separator 1022. For example, separator 1012 can have openings of about 0.89 mm (approximately 0.035 of an inch) while separator 1022 can have openings of about 0.25 mm (approximately 0.010 of an inch). As another example, separator 1012 can have openings of about 1.52 mm (approximately 0.060 of an inch) while separator 1022 can have openings of about 0.25 mm (approximately 0.010 of an inch).

In operation, a flushed manure slurry 1040 is collected in holding basin 1010. Holding basin 1010 need only be large enough to hold the slurry from a single flushing, although additional capacity would be needed if back up pumping capacity is unavailable. As a result, holding basin 1010 can be small in size.

Pumping system 1014 then pumps slurry 1040 from basin 1010 into separator 1012. Separator 1012 outputs a once-screened slurry 1042 that is gravity fed into separator 1022, and an amount of stackable solids that fall over front edge 342 of separator 1012. Separator 1022 outputs a twice-screened slurry 1044 that is gravity fed into lagoon 1030, and an amount of stackable solids that fall over front edge 342 of separator 1022. Pumping system 1032 then pumps twice-screened slurry 1044 out for irrigation, such as for alfalfa fields, or flushing.

Figure 11:
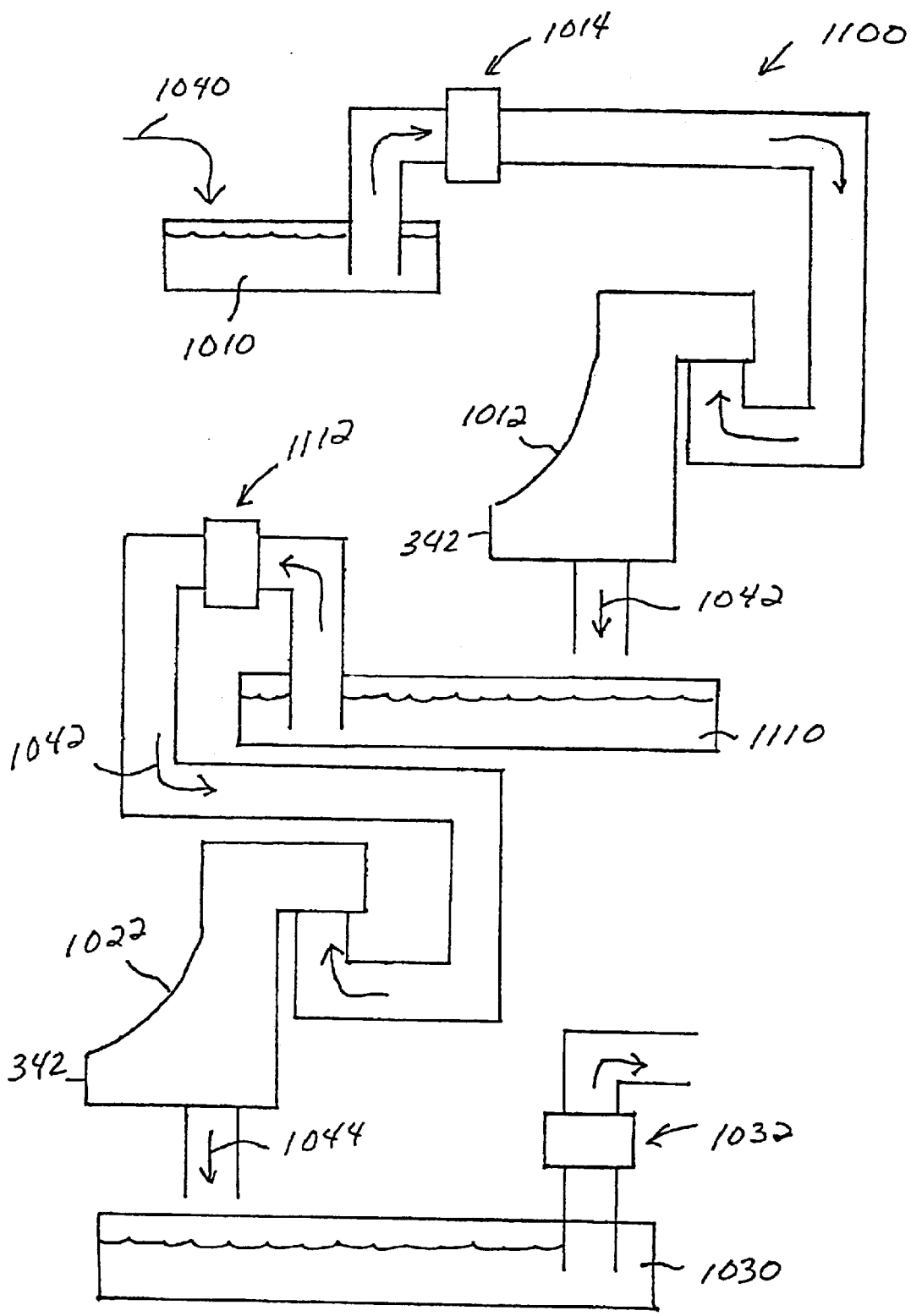
FIG. 11 is a drawing illustrating a manure management system 1100 in accordance with the present invention.

FIG. 11 shows a drawing that illustrates a manure management system 1100 in accordance with the present invention. System 1100 is similar to system 1000 and, as a result, utilizes the same reference numerals to designate the structures which are common to both systems.

As shown in FIG. 11, system 1100 differs from system 1000 in that system 1000 includes a second holding basin 1110 that receives slurry from separator 1012, and a pumping system 1112 that pumps slurry from basin 1110 to separator 1022. System 1100 operates the same as system 1000 except that once-screened slurry 1042 output by separator 1012 is gravity fed into basin 1110, and pumping system 1112 then pumps once-screened slurry 1042 into separator 1022. Basin 1110 can be made quite small if slurry is pumped into separator 1022 before pumping system 1014 stops pumping slurry from basin 1010.

When reused for flushing, experimental results have indicated that the use of twice-screened slurry 1044 has a scrubbing effect that tends to clean the flushed areas. In addition, recycling and reusing twice-screened slurry 1044 significantly minimizes the amount of fresh water that needs to be introduced into the flushing system.

When slurry 1040 is processed within a few hours (e.g., six hours or less) of being collected, significantly more solids are removed from the slurry. Experimental results taken from freshly-collected, twice-screened slurry 1044 indicate that the use of separators 1012 and 1022 removes 90% and more of the solids from slurry 1040. This is in stark contrast to the 16% of the solids that are removed by prior-art separator 100. One benefit of this dramatic increase in the percentage of removed solids is that the useful life of the lagoons is significantly extended.

Table 1 provides the results of a test taken with freshly collected slurry run over separator 900 with a 0.89 mm (approximately 0.035 of an inch) screen.

TABLE 1

| Particle Size | Before 0.89 mm | After 0.89 mm | % Reduction |
|---|---|---|---|
| >2.0 mm | 44.47 g | 0.21 g | 99.52% |
| 1.0–2.0 mm | 4.41 g | 2.18 g | 50.54% |
| 0.5–1.0 mm | 2.84 g | 4.60 g | −61.86% |
| 0.25–0.5 mm | 2.80 g | 3.44 g | −23.14% |
| Total | 54.52 g | 10.43 g | 80.85% |

Thus, as shown in Table 1, when processed within a few hours of collection, separator 900 with an opening size of 0.89 mm (approximately 0.035 of an inch) removes nearly 81% of the total solids, with over 99% of the solids greater than 2.0 mm and over 50% of the solids between 1.0 mm and 2.0 mm being removed. However, separator 900 increases the percentage of smaller solids.

Table 2 provides the results of a test taken with freshly collected slurry that is run over two separators, a 0.89 mm (approximately 0.035 of an inch) separator followed by a 0.25 mm (approximately 0.010 of an inch) separator.

TABLE 2

| Particle Size | Before 0.89 mm | After 0.25 mm | % Reduction |
|---|---|---|---|
| >2.0 mm | 44.47 g | 0.01 g | 99.97% |
| 1.0–2.0 mm | 4.41 g | 0.02 g | 99.48% |
| 0.5–1.0 mm | 2.84 g | 0.97 g | 65.90% |
| 0.25–0.5 mm | 2.80 g | 2.63 g | 6.04% |
| Total | 54.52 g | 3.63 g | 93.35% |

Thus, as shown in Table 2, when processed within a few hours of collection, double separation with an opening size of 0.89 mm (approximately 0.035 of an inch) followed by an opening size of 0.25 mm (approximately 0.010 of an inch)

removes over 93% of the total solids, with over 99% of the solids greater than 1.0 mm being removed. Double separation also removes smaller particle sizes.

Table 3 provides the results of a test taken with freshly collected slurry that is run over two separators, a 0.89 mm (approximately 0.035 of an inch) separator followed by a 0.20 mm (approximately 0.008 of an inch) separator.

TABLE 3

| Particle Size | Before 0.89 mm | After 0.20 mm | % Reduction |
|---|---|---|---|
| >2.0 mm | 41.24 g | 0 g | 100% |
| 1.0–2.0 mm | 5.41 g | 0 g | 100% |
| 0.5–1.0 mm | 3.73 g | 0.04 g | 98.83% |
| 0.25–0.5 mm | 3.91 g | 1.28 g | 67.25% |
| Total | 54.29 g | 1.32 g | 97.56% |

Thus, as shown in Table 3, when processed within a few hours of collection, double separation with an opening size of 0.89 mm (approximately 0.035 of an inch) followed by an opening size of 0.008 inch removes over 97% of the total solids, with all of the solids greater than 1.0 mm, and over 98% of the solids between 0.5 and 1 mm being removed. Double separation also removes over 67% of the smaller particle sizes.

Another benefit is that if slurry 1040 is processed within a few hours after being collected (e.g., six hours or less), the amount of nutrients and salts that are loaded into twice-screened slurry 1044 is significantly reduced. Experimental results indicate that the double screening process outputs a twice screened slurry that has approximately 70% less phosphorous and approximately 90% nitrogen than the manure slurry introduced to the first separator. (The nitrogen levels are about twice the levels of normal cow manure, a dramatic reduction in the amount of nitrogen that is present in unscreened slurry taken from a settling lagoon.)

Figure 12:
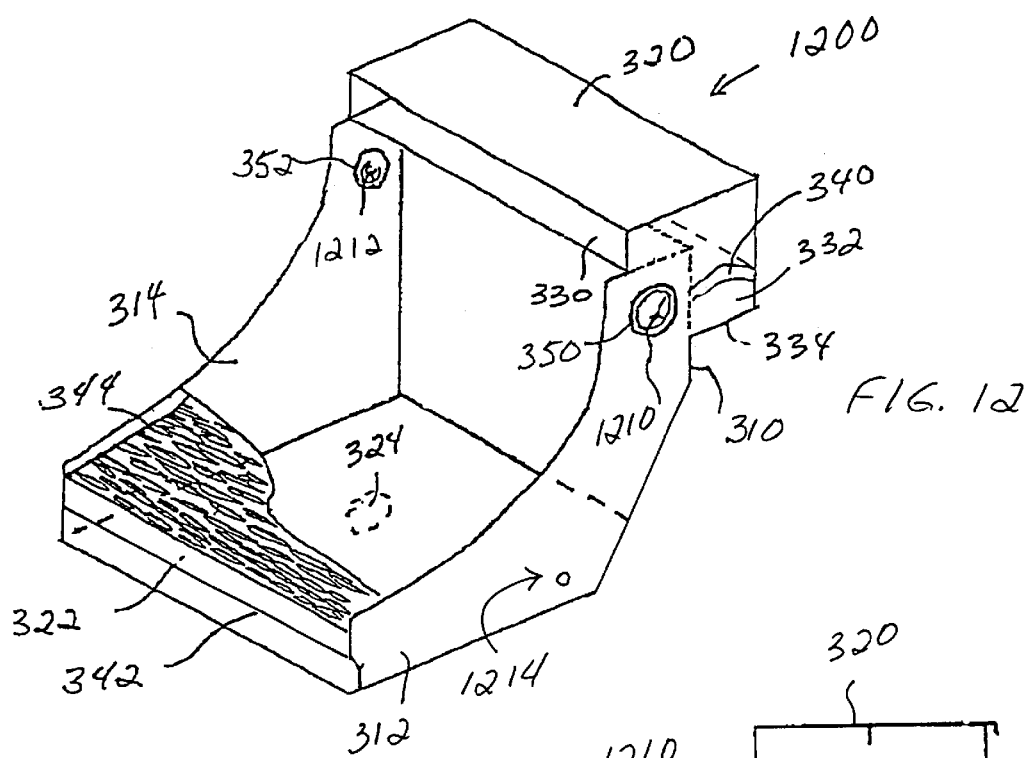
FIG. 12 is a cut-away perspective view illustrating a sloped-screen separator 1200 in accordance with the present invention.
Figure 13:
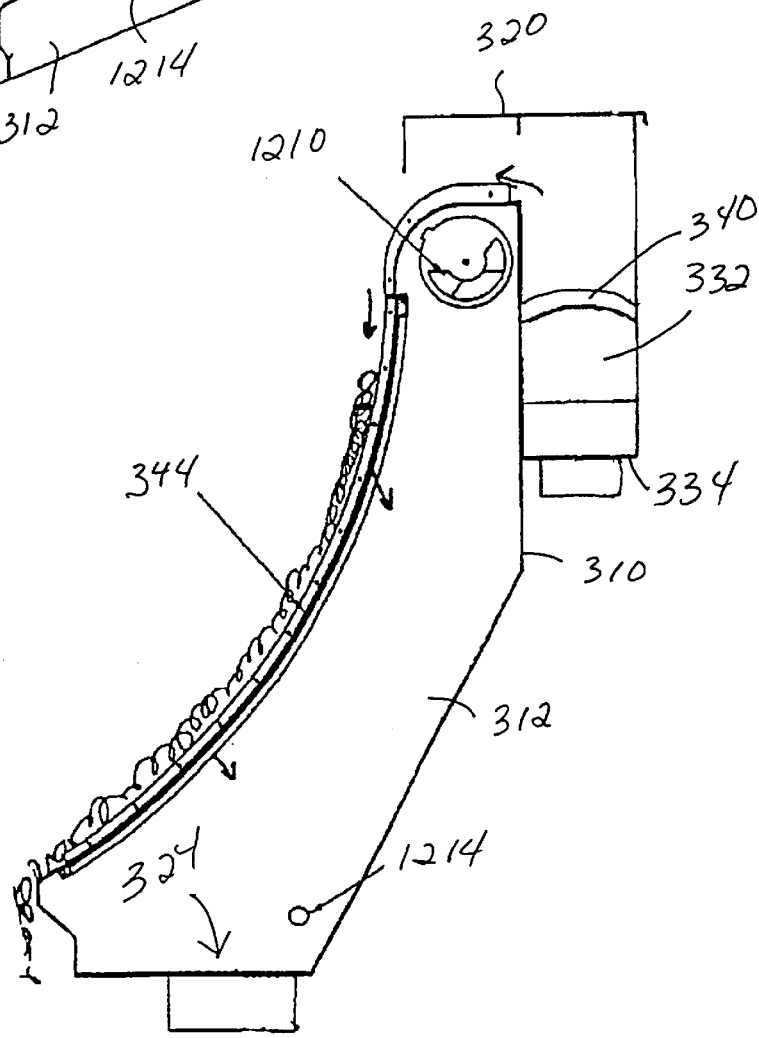
FIG. 13 is a side view of separator 1200 in accordance with the present invention.

FIG. 12 shows a cut-away perspective view that illustrates a sloped-screen separator 1200 in accordance with the present invention. FIG. 13 shows a side view of separator 1200 in accordance with the present invention. Separator 1200 is similar to separator 300 and, as a result, utilizes the same reference numerals to designate the structures which are common to both separators.

As shown in FIGS. 12 and 13, separator 1200 differs from separator 300 in that separator 1200 utilizes an adjustable vent 1210 as an example of a structure that can be used to implement air flow controller 350, and an adjustable vent 1212 as an example of a structure that can be used to implement air flow controller 352. Separator 1200 further utilizes a different style baffle 340 with a lower position.

As further shown in FIGS. 12 and 13, separator 1200 also includes a lower vacuum opening 1214 that is formed in side wall 312 (or both side walls 312 and 314) adjacent to slurry exit opening 324. A vacuum pump can be connected to vacuum opening 1214 via a vacuum line. Alternately, vacuum opening 1214 can be capped.

The vacuum pump provides additional control of the vacuum within the separator. As noted above, screened slurry flowing out slurry exit opening 324 creates a vacuum. The vacuum, however, is a function of the height of separator 1200 off of the ground. Thus, a vacuum pump can be particularly helpful when separator 1200 is setting on the ground or close to it. A vacuum pump can also be helpful when first beginning before a sufficient vacuum has been developed. (The vacuum pump can alternately insert air rather than withdrawing air to vary the vacuum.)

In operation, the volume of air pulled through screen 344 is determined by the number of vents that are open, partially opened, or closed, and the vacuum provided, if any, from a vacuum pump. For example, if all of the vents 1210 and 1212 are closed and vacuum opening 1214 is closed, all of the air would be pulled through screen 344.

Figure 14:
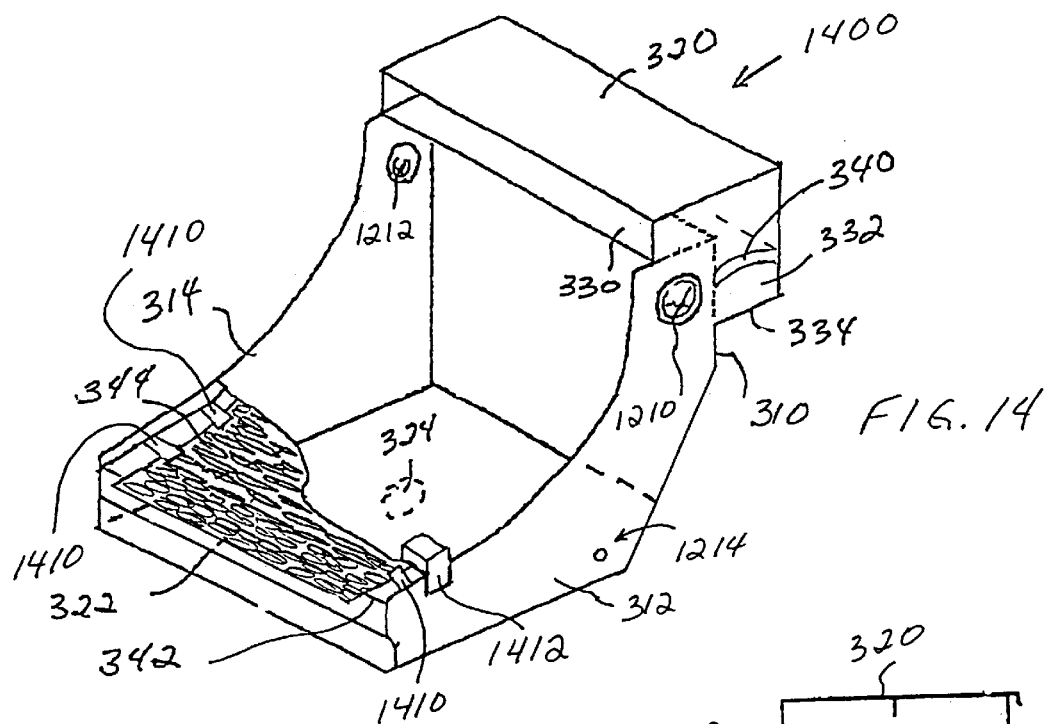
FIG. 14 is a cut-away perspective view illustrating a sloped-screen separator 1400 in accordance with the present invention.
Figure 15:
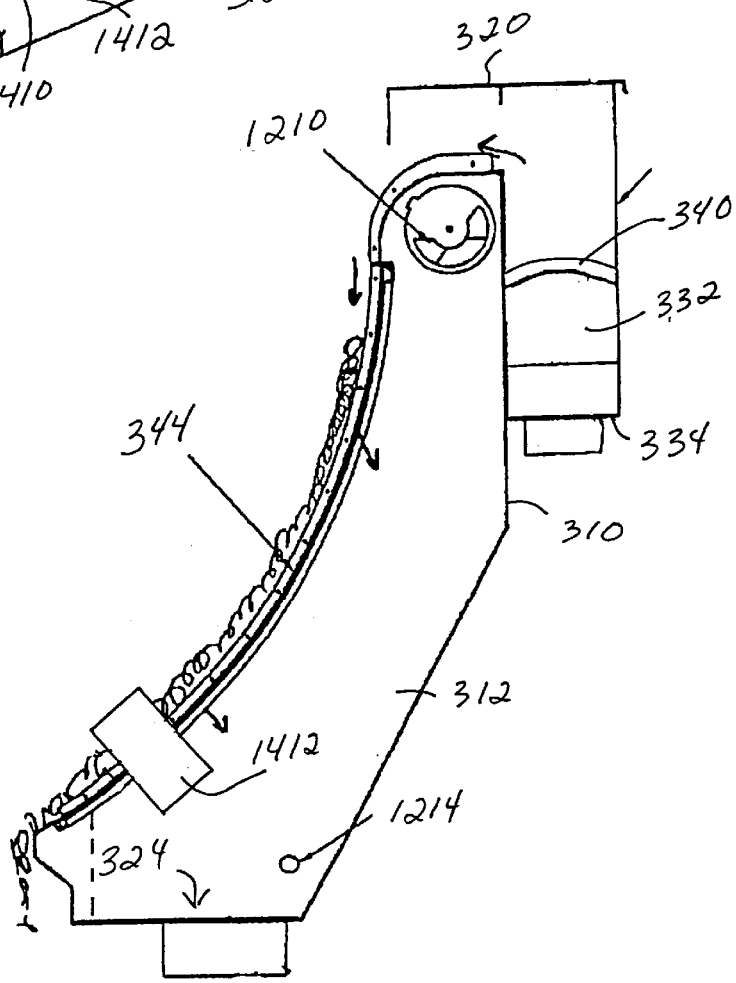
FIG. 15 is a side view of separator 1400 in accordance with the present invention.

FIG. 14 shows a cut-away perspective view that illustrates a sloped-screen separator 1400 in accordance with the present invention. FIG. 15 shows a side view of separator 1400 in accordance with the present invention. Separator 1400 is similar to separator 1200 and, as a result, utilizes the same reference numerals to designate the structures which are common to both separators.

As shown in FIGS. 14 and 15, separator 1400 differs from separator 1200 in that separator 1400 includes a number of flexible attachment strips 1410 that connect and secure screen 344 to side walls 312 and 314. When strips 1410 are used, screen 344 lies under ledge 330 to receive the slurry, and extends over front edge 342. Separator 1400 also includes a screen vibrator 1412 that is attached to screen 344 and side wall 312. Screen vibrator 1412, which can be electric, hydraulic, or pneumatic, vibrates screen 344 as slurry flows over screen 344.

Figure 16:
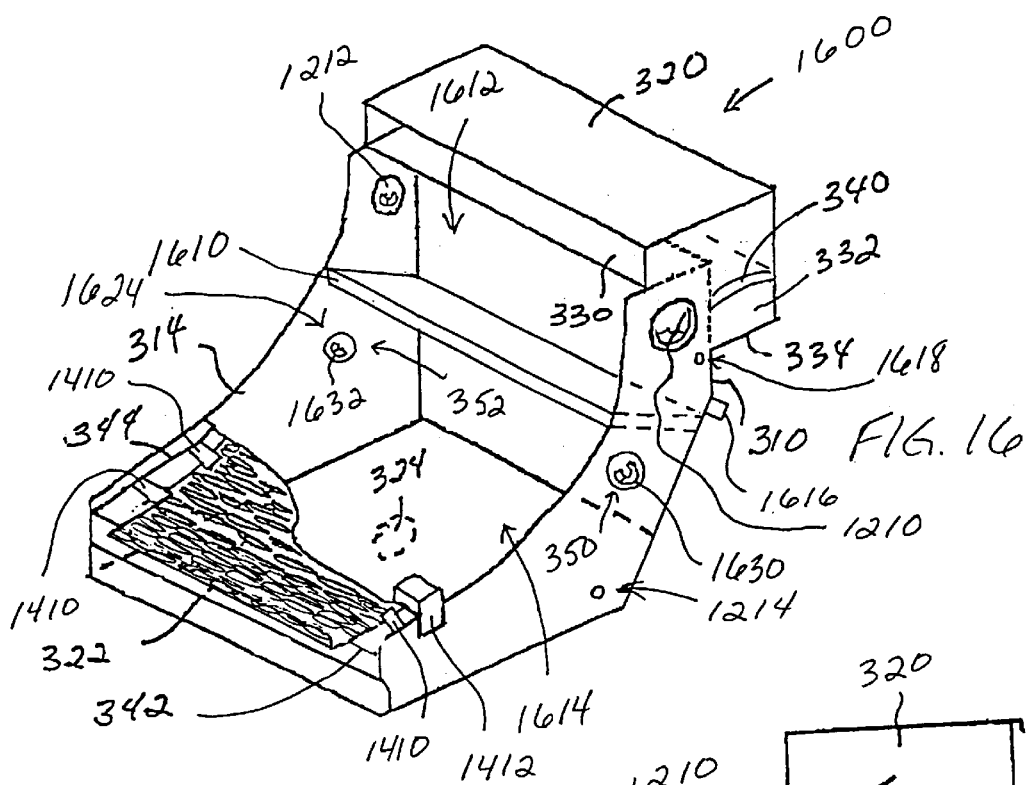
FIG. 16 is a cut-away perspective view illustrating a sloped-screen separator 1600 in accordance with the present invention.
Figure 17:
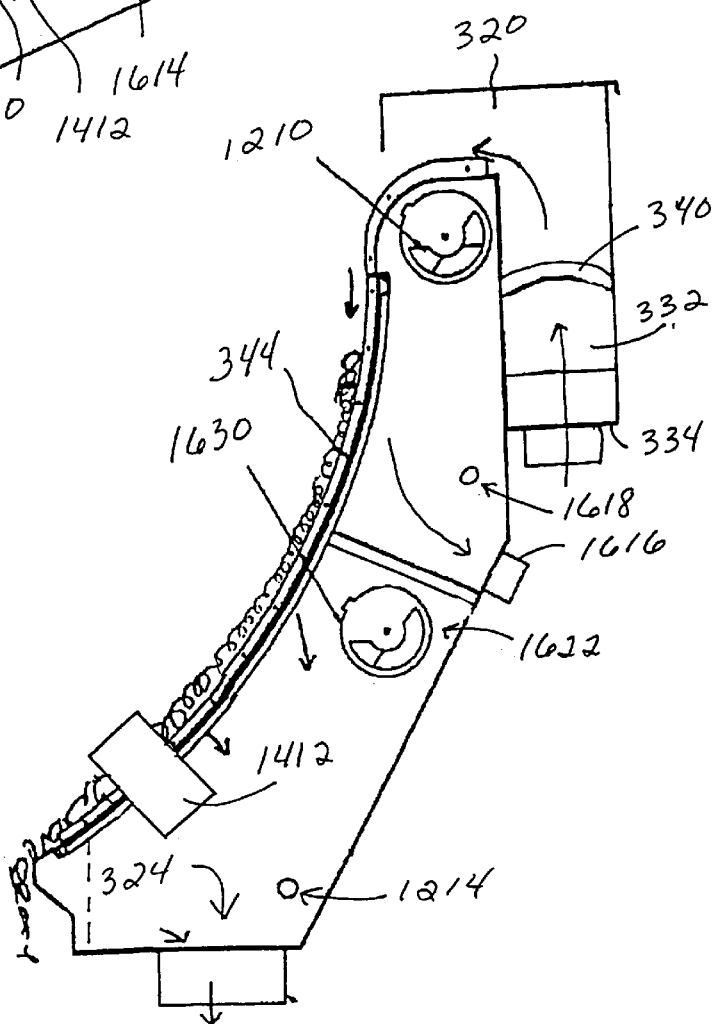
FIG. 17 is a side view of separator 1600 in accordance with the present invention.

FIG. 16 shows a cut-away perspective view that illustrates a sloped-screen separator 1600 in accordance with the present invention. FIG. 17 shows a side view of separator 1600 in accordance with the present invention. Separator 1600 is similar to separator 1400 and, as a result, utilizes the same reference numerals to designate the structures which are common to both separators.

As shown in FIGS. 16 and 17, separator 1600 differs from separator 1400 in that separator 1600 includes a metal member 1610 that is connected to side walls 312 and 314 to form an upper compartment 1612 and a lower compartment 1614. In addition, an upper opening 1616 is formed in back wall 310 to provide an outlet for slurry that is collected in upper compartment 1612, and an upper vacuum opening 1618 that is formed in side wall 312 (or both side walls 312 and 314) to provide additional vacuum control (via connection to an external vacuum). Vacuum opening 1618 can alternately be capped.

Further, an opening 1622 is formed in side wall 312, and an opening 1624 is formed in side wall 314 to provide openings into lower compartment 1614. In addition, separator 1600 utilizes an adjustable vent 1630 to implement an air flow controller over opening 1622, and an adjustable vent 1632 to implement an air flow controller over opening 1624.

In operation, the volume of air pulled through screen 344 is determined by the number of vents that are open, partially opened, or closed in both upper and lower compartments 1612 and 1614. For example, if all of the vents 1210, 1212, 1630, and 1632 are closed and vacuum openings 1214 and 1618 are closed, all of the air would be pulled through screen 344.

FIG. 18 shows a cut-away perspective view that illustrates a sloped-screen separator 1800 in accordance with the present invention. FIG. 19 shows a side view of separator 1800 in accordance with the present invention. Separator 1800 is similar to separator 1600 and, as a result, utilizes the same reference numerals to designate the structures which are common to both separators.

As shown in FIGS. 18 and 19, separator 1800 differs from separator 1600 in that separator 1800 does not include flexible attachment strips 1410 and screen vibrator 1412. Separators 1200, 1400, 1600, and 1800 can also be used to implement second separator 1022 in the manure management systems shown in FIGS. 10 and 11.

It should be understood that the above descriptions are examples of the invention described herein, and other structures may be employed in practicing the invention. For example, although openings 316, 318, 710, 1214, 1618, 1622, and 1624 are shown as formed in side walls 312 and 314, respectively, these openings can be formed in any surface that forms a part of the outflow (upper and lower) compartment, such as back wall 310, that does not interfere with the flow of slurry. Further, rather than using openings 316 and 318, a single opening can alternately be used.

In addition, air flow controllers 350 and 352 can be implemented with any device which can be used to vary the volume of air that can flow into openings 316 and 318, adjustable vents 1210 and 1212 being one example. Further, although separators 1200, 1400, 1600, and 1800 are shown without water line 354 and spray heads 356, water line 354 and spray heads 356 can be used with separators 1200, 1400, 1600, and 1800.

Additionally, screen 344 can be flexibly connected to side walls 312 and 314, and vibrator 1412 can be connected to vibrate screen 344 in each of the separator examples (which includes separators 300, 700, 800, and 900) described above. Further, vacuum opening 1214 can also be utilized in each of the separator examples described above, and each of the separator examples described above can be placed at any height relative to the ground (separator 1012 sits above separator 1022 to allow a gravity feed). The separators can also be placed below ground level if desired.

Thus, it is intended that the following claims define the scope of the invention and that methods and structures within the scope of these claims and their equivalents be covered thereby.

What is claimed is:

1. A separators comprising:
a sloped screen that receives a manure slurry, the sloped screen having a plurality of screen openings and a width;
a collection compartment connected to the sloped screen, the collection compartment having an air flow opening and a slurry exit opening, and receiving a screened slurry that falls through the sloped screen when the manure slurry flows onto the sloped screen, the screened slurry flowing out through the slurry exit opening; and
an air flow controller connected to the collection compartment, the air flow controller controlling a first volume of air that flows through the sloped screen as a result of the screened slurry flowing through the slurry exit opening, wherein
the air flow controller variably controls a second volume of air that can flow into the air flow opening to thereby vary the first volume of air that is pulled through the sloped screen.

2. The separator of claim 1 and further comprising:
a water pipe connected to the collection compartment that extends across the sloped screen; and
a plurality of spray heads connected to the water pipe, the spray heads outputting a liquid at a rate, the rate ranging from equal to or greater than 113 liters per hour to equal to or less than 1362 liters per hour per approximately 0.31 meters of the width.

3. The separator of claim 1 wherein the openings have a size that ranges from approximately 0.15 mm to 0.4 mm.

4. A separator comprising:
a sloped screen that receives a manure slurry, the sloped screen having a plurality of screen openings and a width;
a collection compartment connected to the sloped screen, the collection compartment having an air flow opening and a slurry exit opening, and receiving a screened slurry that falls through the sloped screen when the manure slurry flows onto the sloped screen, the screened slurry flowing out through the slurry exit opening; and
an air flow controller connected to the collection compartment, the air flow controller controlling a first volume of air that flows through the sloped screen as a result of the screened slurry flowing through the slurry exit opening, wherein
the screen is flexibly connected to the collection compartment, and further comprising a vibrator connected to the screen.

5. A separator comprising:
a sloped screen that receives a manure slurry, the sloped screen having a plurality of screen openings and a width;
a collection compartment connected to the sloped screen, the collection compartment having an air flow opening and a slurry exit opening, and receiving a screened slurry that falls through the sloped screen when the manure slurry flows onto the sloped screen, the screened slurry flowing out through the slurry exit opening; and
an air flow controller connected to the collection compartment, the air flow controller controlling a first volume of air that flows through the sloped screen as a result of the screened slurry flowing through the slurry exit opening,
wherein the collection compartment includes:
an upper compartment with an upper slurry exit opening; and
a lower compartment with the slurry exit opening, and wherein the upper compartment includes a first vacuum opening, and the lower compartment includes a second vacuum opening, a air controller formed over the second vacuum opening, and a third vacuum opening.

6. A separator comprising:
a sloped screen that receives a manure slurry, the sloped screen having a plurality of screen openings and a width;
a collection compartment connected to the sloped screen, the collection compartment having an air flow opening and a slurry exit opening, and receiving a screened slurry that falls through the sloped screen when the manure slurry flows onto the sloped screen, the screened slurry flowing out through the slurry exit opening;
an air flow controller connected to the collection compartment, the air flow controller controlling a first volume of air that flows through the sloped screen as a result of the screened slurry flowing through the slurry exit opening; and
a vacuum opening formed in the collection compartment.

7. A separator comprising:
a sloped screen that receives a manure slurry, the sloped screen having a plurality of screen openings and a width;
a collection compartment connected to the sloped screen, the collection compartment having an air flow opening and a slurry exit opening, and receiving a screened slurry that falls through the sloped screen when the manure slurry flows onto the sloped screen, the screened slurry flowing out through the slurry exit opening;

an air flow controller connected to the collection compartment, the air flow controller controlling a first volume of air that flows through the sloped screen as a result of the screened slurry flowing through the slurry exit opening; and an input compartment connected to the output compartment, the input compartment having an input opening and an output opening, a manure slurry being pumped into the input compartment through the input opening, and flowing out through the output opening onto the sloped screen.

8. A separator comprising:

an input compartment having an input opening and an output ledge, a manure slurry being pumped into the input compartment through the input opening, and flowing out over the output ledge;

a sloped screen connected to the output ledge of the input compartment, the sloped screen having a plurality of screen openings and a width, the manure slurry flowing out over the output ledge onto the sloped screen when the manure slurry is pumped into the input compartment;

a collection compartment connected to the sloped screen, the collection compartment having an air flow opening and a slurry exit opening, and receiving a screened slurry that falls through the sloped screen when the manure slurry is pumped into the input compartment, the screened slurry flowing out through the slurry exit opening;

a water pipe connected to the collection compartment that extends across the sloped screen; and a plurality of spray heads connected to the water pipe, the spray heads outputting a liquid at a rate, the rate ranging from equal to or greater than 113 liters per hour to equal to or less than 1362 liters per hour per approximately 0.31 meters of the width.

9. The separator of claim 8 and further comprising an air flow controller connected to the collection compartment, the air flow controller controlling a first volume of air that flows through the sloped screen as a result of the screened slurry flowing through the slurry exit opening, the air flow controller variably controlling a second volume of air that can flow into the air flow opening to thereby vary the first volume of air that is pulled through the sloped screen.

10. A separator comprising:

an input compartment having an input opening and an output opening, a manure slurry being pumped into the input compartment through the input opening, and flowing out through the output opening;

a sloped screen connected to the output opening of the input compartment, the sloped screen having a plurality of screen openings and a width, the manure slurry flowing out over the output opening onto the sloped screen when the manure slurry is pumped into the input compartment;

a collection compartment connected to the sloped screen, the collection compartment having an air flow opening and a slurry exit opening, and receiving a screened slurry that falls through the sloped screen when the manure slurry is pumped into the input compartment, the screened slurry flowing out through the slurry exit opening; and an air flow controller connected to the collection compartment, the air flow controller controlling a first volume of air that flows through the sloped screen as a result of the screened slurry flowing through the slurry exit opening.

11. A manure management system comprising:

a first holding basin that holds a flushed manure slurry;

a first separator, the first separator having a first sloped screen, the first sloped screen having a plurality of openings, the first separator receiving the flushed manure slurry and outputting a once-screened slurry;

a first pumping system placed in the first holding basin and connected to the first separator, the first pumping system pumping the flushed manure slurry from the first holding basin to the first separator;

a second separator, the second separator receiving the once-screened slurry and outputting a twice-screened slurry, the second separator having:

a second sloped screen having a plurality of openings and a width, the once-screened slurry flowing over the second sloped screen;

a collection compartment connected to the second sloped screen, the collection compartment having an air flow opening and a slurry exit opening, and receiving a second-screened slurry that falls through the second sloped screen, the second-screened slurry flowing out through the slurry exit opening.

12. The system of claim 11 and further comprising an air flow controller connected to the collection compartment, the air flow controller controlling a volume of air that flows through the second sloped screen as a result of the second-screened slurry flowing through the slurry exit opening.

13. The system of claim 11 wherein the openings in the first sloped screen are larger than the openings in the second sloped screen.

14. The system of claim 11 and further comprising:

a second holding basin that receives the once-screened slurry; and a second pumping system placed in the second holding basin and connected to the second separator, the second pumping system pumping once-screened slurry from the second holding basin to the second separator.

15. The system of claim 11 wherein the second separator further comprises:

a water pipe connected to the collection compartment that extends across the second sloped screen; and a plurality of spray heads connected to the water pipe, the spray heads outputting a liquid at a rate, the rate ranging from equal to or greater than 113 liters per hour to equal to or less than 1362 liters per hour per approximately 0.31 meters of the width.

16. A manure management system comprising:

a first holding basin that holds a flushed manure slurry;

a first separator, the first separator having a first sloped screen, the first sloped screen having a plurality of openings, the first separator receiving the flushed manure slurry and outputting a once-screened slurry;

a first pumping system placed in the first holding basin and connected to the first separator, the first pumping system pumping the flushed manure slurry from the first holding basin to the first separator;

a second separator, the second separator receiving the once-screened slurry and outputting a twice-screened slurry, the second separator having:

an input compartment that receives the once-screened slurry, the input compartment having a input opening and an output opening;

a second sloped screen connected to the output opening of the input compartment, the second sloped screen having a plurality of openings and a width, the once-screened slurry flowing over the second sloped screen when slurry flows into the input compartment;

a collection compartment connected to the second sloped screen, the collection compartment having an air flow opening and a slurry exit opening, and receiving a second-screened slurry that falls through the second sloped screen, the second-screened slurry flowing out through the slurry exit opening.

17. A method for removing solids from a manure slurry, the method comprising the steps of:

running the manure slurry over a sloped screen, the sloped screen having a width and a plurality of screen openings;

controlling a volume of air that flows through the sloped screen;

collecting a screened slurry that falls through the sloped screen in a collection compartment;

running the screened slurry over a second sloped screen, the second sloped screen having a width and a plurality of screen openings;

controlling a volume of air that flows through the second sloped screen; and collecting a twice screened slurry that falls through the second sloped screen in a second collection compartment.

18. A method for removing solids from a manure slurry, the method comprising the step of:

running the manure slurry over a sloped screen, the sloped screen having a width and a plurality of screen openings;

controlling a volume of air that flows through the sloped screen;

collecting a screened slurry that falls through the sloped screen in a collection compartment; and spraying the manure slurry on the screen with a liquid with sprayers at a rate, the rate ranging from equal to or greater than 113 liters per hour to equal to or less than 1362 liters per hour per approximately 0.31 meters of the width.

19. A method for removing solids from a manure slurry, the method comprising the steps of:

running the manure slurry over a sloped screen, the sloped screen having a width and a plurality of screen openings;

spraying the manure slurry on the screen with a liquid with sprayers at a rate, the rate ranging from equal to or greater than 113 liters per hour to equal to or less than 1362 liters per hour per approximately 0.31 meters of the width; and collecting a screened slurry that falls through the sloped screen in a collection compartment.

20. The method of claim 19 and further comprising the step of controlling a volume of air that flows through the sloped screen.

* * * * *